United States Patent [19]
Wolcott

[11] 4,385,044

[45] May 24, 1983

[54] TREATMENT OF CONTAMINATED STRETFORD SOLUTION

[75] Inventor: Richard A. Wolcott, Richwood, Tex.

[73] Assignee: The Dow Chemical Company, Midland, Mich.

[21] Appl. No.: 300,085

[22] Filed: Sep. 8, 1981

[51] Int. Cl.$^3$ .............................................. C01B 17/04
[52] U.S. Cl. ................................ 423/573 R; 423/226; 260/370
[58] Field of Search ............... 423/226, 236, 571, 573; 260/370

[56] References Cited

U.S. PATENT DOCUMENTS 3,873,581  3/1975  Fitzpatrick et al. ................. 260/320
4,118,467  10/1978  Sano et al. ....................... 423/573 R
4,260,590  4/1981  Weber ................................ 423/226

*Primary Examiner*—G. Peters
*Attorney, Agent, or Firm*—W. J. Lee

[57] ABSTRACT

A side-stream portion of a Stretford Process solution is taken from the main-stream in order to reduce the amount of deleterious side-products in the solution and the ADA values and vanadium values are salvaged from the side-stream by taking up the ADA values on activated charcoal and the vanadium values in an anion exchange resin. The ADA and vanadium values are recovered for re-cycling back to the Stretford Process.

25 Claims, No Drawings

TREATMENT OF CONTAMINATED STRETFORD SOLUTION

BACKGROUND OF THE INVENTION

The present invention pertains to salvaging of sodium anthraquinone disulphonate and vanadium salts from Stretford Process solutions and recycling of said anthraquinone (ADA) values and vanadium values.

The Stretford Process is well established in the art of gas purification for the removal of $H_2S$ from "foul gas" or "tail gas" streams of various compositions and origins, such as gas streams evolved from refining of petroleum or coal products. The Stretford Process employs, fundamentally, an alkaline aqueous solution comprising a salt of an anthraquinone disulfonic acid (ADA), such as $Na_2$-ADA, and a vanadium salt, such as sodium vanadate. During its use the Stretford solution, acting on the $H_2S$ and other gas components, builds up various levels of side-products such as sodium thiosulfate, sodium sulfate, and various "alkalinities" such as sodium carbonate and sodium bicarbonate due to reaction with the alkali (pref. NaOH) employed to maintain the solution alkaline.

In particular, the present invention pertains to a process whereby a portion of the Stretford solution is removed as a side-stream in order to maintain the build-up of various side-products to a controllable, allowable concentration, the process being particularly effective in substantially removing sodium sulfate and sodium thiosulfate in the side-stream, while salvaging a substantial amount of the ADA values and the vanadium values, both of these values being recycled to the Stretford solution. Thus, as the Stretford Solution is continuously cycled through its use step and through its recovery, clean-up, and replenishment steps, the level of deleterious sulfate and thiosulfate is effectively controlled, the loss of expensive ADA and vanadium salt is substantially minimized, and the alkalinity or basicity of the solution is maintained. This process effectively avoids the need for acidification of the Stretford solution to destroy the thiosulfate, which then requires re-alkalizing; the re-alkalizing forms soluble salts of the acid used for acidification.

Various patents relating to the Stretford Process and to handling, using, or treating the Stretford solution are, e.g., U.S. Pat. Nos. 2,997,439; 3,035,889; 3,097,926; 3,752,877; 3,810,833; 3,904,734; 3,959,452; 3,975,508; 4,017,594; 4,118,467; 4,206,194; and European Patent Application Publ. No. 0 002 880 A3 having an Application No. 78300471.6 filed 09.10.78.

SUMMARY OF THE INVENTION

A portion of an alkaline aqueous solution (viz. a "Stretford Solution") containing a salt of anthraquinone disulfonic acid (ADA), a vanadium salt, soluble alkalinities, sulfate values and thiosulfate values is separated as a side-stream from the sulfur particle-containing mainstream. The sidestream is contacted with activated charcoal which takes up the ADA from the solution, then is contacted with an anion exchange resin to take up the vanadium values from the solution, the thiosulfate and sulfate values substantially remaining with the solution. The ADA and vanadium values are recovered from the charcoal and exchange resin using an aqueous wash and are recycled to the Stretford Solution for further use.

DETAILED DESCRIPTION OF THE INVENTION

The Stretford solution for use in the present invention is one which contains the requisite amount of ADA-salt (esp. $Na_2$-ADA), of vanadium salt (esp. sodium vanadate), of side products of the alkaline material (esp. NaOH) used in maintaining the solution at a basic pH, and a sulfate and/or thiosulfate side-product (e.g. $Na_2S_2O_3$ and $Na_2SO_4$).

Ordinarily the amount of ADA-salt in the solution is maintained in the range of about 1 to about 2 gm./liter, though greater or lesser concentrations may sometimes be encountered. The preferred concentration is usually in the range of about 1.5 to about 2.0 gm./liter.

The amount of vanadium salt in the solution is usually in the range of about 4 to about 6 gm./liter, preferably about 5.5 to about 6.0 gm./liter, though greater or lesser concentrations may sometimes be encountered.

The amount of alkaline material (esp. NaOH) employed to maintain the Stretford solution at a basic pH is somewhat dependent on the amount of acid or other reactants in a given volume of gas being treated. The CO, $CO_2$, $H_2S$, $SO_2$, etc. reacts with caustic to form salts. Thiosulfates are formed from NaHS and oxygen. Ordinarily there is an amount of alkaline material in the Stretford solution, including make-up amounts, sufficient to maintain an alkaline pH, preferably a pH of about 8.5 to about 9.0.

The temperature of the Stretford solution is principally decided by the amount of heat taken up from contact with the hot tail gases. Due to heat losses from the piping and equipment, the temperature of the Stretford solution at the point in the process at which the present invention is applied is cooler, but is still fairly warm, usually being in the range of about 30° C. to about 40° C. The aqueous wash used in regenerating the charcoal may be at ambient temperature, but is preferably in the range of about 35° C. to about 100° C., most preferably at or near 100° C. The alkaline aqueous wash of the anion exchange resin may be at ambient temperature, and is preferably in the range of about 35° C. to about 50° C. Higher temperatures may be used if the resin stability against decomposition or degradation is not jeopardized by such higher temperatures. The water-eluted ADA values and caustic-eluted vanadium values from the charcoal and exchange resin, respectively, are usually recycled back to the circulating Stretford solution without adjustment of temperature. The anion exchange resin usually takes up an appreciable portion of any carbonate and bicarbonate ions in the Stretford solution and these values are also washed out by the caustic wash along with the vanadium values and are also returned to the Stretford solution. In comparison with the cost and worth of the ADA and vanadium compounds, the extraneous carbonate, bicarbonate, sulfate, thiosulfate, sulfur, and other such compounds have relatively little value.

During the washing of the ADA-loaded charcoal with water or caustic to wash out the ADA compound, which is preferably done using very hot (up to about 100° C.) water or caustic, there sometimes is a relatively small amount of sulfate, thiosulfate or other side-products from the Stretford solution which are also washed out of the charcoal, but these are in tolerable amounts and may be re-cycled along with the ADA.

Washing of the anion exchange resin with caustic to wash out the vanadium compounds and regenerate the resin may be done at ambient temperature to 100° C. (if the resin will withstand hot caustic), but is preferably done at a temperature in the range of about 30° C. to about 50° C. Conveniently, the regeneration is done with caustic at a temperature closely approximating the temperature of the Stretford solution when it passes through the resin. The alkaline effluent from the wash cycle brings out vanadium values and usually contains tolerable amounts of the carbonate, bicarbonate and other side products of the Stretford solution which may have remained in the resin following the resin loading step. The caustic wash from the resin can be employed as the wash liquor for the charcoal, esp. if heated to a temperature of up to about 100° C.

The anion exchange resin may be any of the strong or weak base resins available for use as anion exchange resins. Preferably the resin is of the strong base variety. Anion exchange resin available under the commercial tradenames of, e.g., DOWEX, AMBERLITE, AMBERLYST, DUOLITE, and IONAC are suitable, some of the resins being of the porous variety and some of the gel-type.

The activated charcoal may be any of the commercially available finely-divided chars having activated, highly absorbent surfaces. By "activated charcoal" and "chars" it is meant that any of the known activated carbon char materials derived from carbonaceous materials may be used.

NaOH is the preferred caustic to be used in the present invention, especially because it is readily available and relatively inexpensive, but other alkali metal hydroxides, such as KOH, may be used. If commercial grades of caustic are used which contain chloride impurities, these chloride impurities may build up to a deleterious concentration unless steps are taken to limit the build-up. The present invention is beneficial with respect to chloride build-up in that while the process is effective in substantially removing sulfates and thiosulfates from the treated side-streams, it also substantially removes $Cl^-$ ions at the same time. For instance, a sulfur particle-free portion of Stretford Solution containing 3800 ppm $Cl^-$ ion (among its other ingredients) is passed through a charcoal filter, then through an anion exchange bed, and the solution is found to still contain 3620 ppm $Cl^-$ ion, the solution at this point being purged from the system; thus over 95% of the $Cl^-$ ion from the portion of Stretford Solution is removed and not re-cycled.

In place of the preferred hot water or hot caustic wash for the charcoal desorption step, one may use aqueous solutions containing inert organic compounds such as acetone or methylene chloride. For instance, it has been determined that water/acetone (3/1 ratio @ 34° C.) and water/methylene chloride (3/1 ratio @ 34° C.) can be used to recover ADA from the charcoal. This is beneficial as it allows regeneration of the charcoal at relatively lower temperature, but it may be advisable to substantially remove the organic portion prior to recycle to the Stretford Solution.

EXAMPLE 1

A 700-ml. portion of Stretford solution is taken as a side-stream from an alkaline mainstream of Stretford solution containing particles of sulfur, a filter being used to keep the particulate sulfur in the mainstream. The side-stream of Stretford solution (34° C., pH 8.8) is passed through a 120 ml activated charcoal column (NUCHAR ® WV-G, 12-40 mesh, a tradename for a product derived from bituminous coal) at 6.5 ml./min. The effluent is then passed through a 120 ml column of DOWEX MSA-1 anion exchange resin (OH⁻form, 20-50 mesh). The effluent from the resin is discarded.

Recovery of the ADA from the charcoal is accomplished by passing 700 ml. of 100° C. water (about neutral pH) through the column at 6.5 ml./min. Recovery of sodium vanadate, sodium carbonate, and sodium bicarbonate from the resin is accomplished by passing 630 ml. of 34° C. sodium hydroxide (4% conc.) through the resin at 6.5 ml./min.

The following Table I indicates the approximate amounts of ADA, V, Na Bicarbonate, Na Carbonate, Na Thiosulfate, and Na Sulfate to be found in the various solutions. Amounts shown are in gms. per liter.

TABLE I

| Identity of Solution | Per Cycle Analysis of Solutions | | | | | |
|---|---|---|---|---|---|---|
| | ADA | V | Bicarb. | Carb. | Thio | Sulf. |
| Stretford at the start | 1.87 | 6.0 | 4 | 7 | 310 | 28 |
| Stretford after charcoal | 0.04 | 5.8 | 3 | 7 | 285 | 28 |
| Aq. eluate from charcoal | 1.85 | 0 | 0 | 0 | 0 | 2 |
| Stretford after resin | 0 | 0.8 | 2 | 3 | 260 | 26 |
| Alkaline eluate from resin | 0 | 6.3 | 5 | 40 | 20 | 0 |

By calculation, the recovery of ADA is about 96% and recovery of vanadate is about 94%. The sulfate and thiosulfate compounds are substantially retained in the discarded effluent.

EXAMPLE 2

A material balance is made by accounting for the ingredients in the recovery stream and the waste (purge) stream and comparing with ingredients used in the feed solution and the regeneration solution.

The feed solution (i.e. the beginning Stretford solution) during the material balance monitoring is (all quantities being parts by weight):

| | |
|---|---|
| $H_2O$ | 38,724.0 |
| Alkalinity | 373.4 |
| $NaVO_3$ | 225.8 |
| ADA | 83.8 |
| $Na_2S_2O_3$ (as the pentahydrate) | 11,853.0 |
| $Na_2SO_4$ | 1,064.0 |

The regeneration solutions employed during the monitoring comprises:

| | |
|---|---|
| $H_2O$ | 59,803.8 |
| NaOH | 625.4 |

The above quantities represent the total amounts into the process. The total amounts out of the process are represented by the amounts in the purge (waste stream) and the recovery stream (for use as recycle).

The purge during the monitoring is:

| | |
|---|---|
| NaOH | 267.8 |
| $H_2O$ | 38,724.0 |
| Alkalinity | 260.5 |
| $NaVO_3$ | 34.7 |
| ADA | 0 |
| $Na_2S_2O_3$ (as the pentahydrate) | 11,289.0 |
| $Na_2SO_4$ | 988.0 |

The recovery during the monitoring is:

| | |
|---|---|
| NaOH | 357.6 |
| $H_2O$ | 59,803.8 |
| Alkalinity | 112.8 |
| $NaVO_3$ | 191.1 |
| ADA | 83.8 |
| $Na_2S_2O_3$ (as the pentahydrate) | 564.0 |
| $Na_2SO_4$ | 76.0 |

From the above figures the amount of recovery of ADA, $NaVO_3$, alkalinity, and NaOH is about:

| | | | |
|---|---|---|---|
| ADA | 100% | Alkalinity | 30.2% |
| $NaVO_3$ | 84.6% | NaOH | 57.2% |
| $Na_2S_2O_3.5H_2O$ | 4.8% | $NaSO_4$ | 7.1% |

The amounts in the purge are about:

| | | | |
|---|---|---|---|
| $Na_2S_2O_3.5H_2O$ | 95.2% | Alkalinity | 69.8% |
| $NaVO_3$ | 15.4% | NaOH | 42.8% |
| $Na_2SO_4$ | 92.9% | | |

In the above ingredients the term "alkalinity" is used to account for compounds which have formed salts with caustic during the tail gas scrubbing operation using the alkaline Stretford solution, such as sodium carbonate, sodium bicarbonate, and the like but the sodium thiosulfate and sodium sulfate are singled out as separate items.

The foregoing examples illustrate particular embodiments, but the invention is limited only by the following claims, not by the particular embodiments illustrated.

I claim:

1. A process for treating a Stretford Process alkaline aqueous solution containing disodium anthraquinone disulfonate, sodium vanadate, sodium carbonate, sodium bicarbonate, sodium thiosulfate, sodium sulfate, sulfur particles, and sodium hydroxide, said process comprising,
    separating a portion of the solution from the sulfur particle-containing solution,
    contacting the said portion with activated carbon to separate anthraquinone disulfonate values from the solution,
    then contacting the said portion with an anion exchange resin to separate vanadate values from the solution,
    obtaining thereby an alkaline aqueous solution which is substantially depleted of said anthraquinone disulfonate values and said vanadate values.

2. The process of claim 1 wherein the carbon is regeneraed by using an aqueous wash to elute the anthraquinone disulfonate values.

3. The process of claim 1 wherein the anion exchange resin is regenerated by using an alkaline aqueous wash to elute the vanadate values.

4. The process of claim 1 wherein the anthraquinone disulfonate values are eluted from the carbon by using an alkaline aqueous wash, the vanadate values are eluted from the anion exchange resin by using an alkaline aqueous wash, and the so-recovered anthraquinone disulfonate values and vanadate values are recycled back to the Stretford Process.

5. A process for the substantial removal of sodium thiosulfate and/or sodium sulfate from a Stretford Process alkaline solution which is substantially free of sulfur particles, said process comprising
    contacting the Stretford solution with activated carbon to substantially remove ADA values therefrom,
    then contacting the Stretford solution with an anion exchange resin to substantially remove vanadate values therefrom,
    following which the solution, now containing little or no ADA values and containing little or no vanadate values, but containing most, if not all, of the thiosulfate and/or sulfate values is removed from the anion exchange resin.

6. The process of claim 5 wherein the carbon is regenerated by using an aqueous wash to elute the ADA values.

7. The process of claim 5 wherein the anion exchange resin is regenerated by using an alkaline aqueous wash to elute the vanadate values.

8. The process of claim 1 or claim 5 wherein the exchange resin is washed with a caustic solution to extract the vanadate values therefrom, then the same caustic solution is used to wash ADA values from the carbon and the caustic solution, containing the vanadate values and ADA values, is recycled to the Stretford Process solution.

9. The process of claim 1 or claim 5 wherein the carbon is regenerated by using an aqueous wash having a temperature in the range of about 35° C. to about 100° C.

10. The process of claim 1 or claim 5 wherein the carbon is regenerated by using an aqueous wash having a temperature at or near 100° C.

11. The process of claim 1 or claim 5 wherein the carbon is regenerated by using an aqueous alkaline solution wash.

12. The process of claim 1 or claim 5 wherein the carbon is regenerated by using an aqueous wash solution containing inert organic material.

13. The process of claim 1 or claim 5 wherein the anion exchange resin is regenerated by using an alkaline aqueous wash having a temperature in the range of about 35° to about 100° C.

14. The process of claim 1 or claim 5 wherein the anion exchange resin is regenerated by using an alkaline aqueous wash having a temperature in the range of about 35° C. to about 50° C.

15. The process of claim 1 or claim 5 wherein the Stretford Solution also contains a minor amount of $Cl^-$ ions, said $Cl^-$ ions substantially remaining with the solution after contact with the carbon and the anion exchange resin.

16. A process for treating a Stretford Process alkaline aqueous solution containing disodium anthraquinone disulfonate, sodium vanadate, sodium carbonate, sodium bicarbonate, sodium thiosulfate, sodium sulfate, sulfur particles, and sodium hydroxide, said process comprising,
    separating a portion of the solution from the sulfur particle-containing solution,
    contacting the said portion with activated carbon to separate anthraquinone disulfonate values from the solution, then separating said portion, now substantially depleted of anthraquinone disulfonate values, from said carbon,
    then contacting the said portion with an anion exchange resin to separate vanadate values from the solution and separating said portion, now substantially depleted of vanadate values, from said anion exchange resin, obtaining thereby an alkaline aqueous solution which is substantially depleted of said anthraquinone disulfonate values and said vanadate values.

17. The process of claim 16 wherein the carbon is regenerated by using an aqueous wash to elute the anthraquinone disulfonate values.

18. The process of claim 16 wherein the anion exchange resin is regenerated by using an alkaline aqueous wash to elute the vanadate values.

19. The process of claim 16 wherein the anthraquinone disulfonate values are eluted from the carbon by using an alkaline aqueous wash, the vanadate values are eluted from the anion exchange resin by using an alkaline aqueous wash, and the so-recovered anthraquinone disulfonate values and vanadate values are recycled back to the Stretford Process.

20. The process of claim 16 wherein the exchange resin is washed with a caustic solution to extract the vanadate values therefrom, then the same caustic solution is used to wash ADA values from the carbon and the caustic solution, containing the vanadate values and ADA values, is recycled to the Stretford Process solution.

21. A process for the substantial removal of sodium thiosulfate and/or sodium sulfate from a Stretford Process alkaline solution which is substantially free of sulfur particles, said process comprising contacting the Stretford solution with activated carbon to substantially remove ADA values therefrom, then separating said solution, now substantially depleted of ADA values, from said carbon, then contacting the Stretford solution with an anion exchange resin to substantially remove vanadate values therefrom, following which the solution, now containing little or no ADA values and containing little or no vanadate values, but containing most, if not all, of the thiosulfate and/or sulfate values is removed from the anion exchange resin.

22. The process of claim 21 wherein the carbon is regenerated by using an aqueous wash to elute the ADA values.

23. The process of claim 21 wherein the anion exchange resin is regenerated by using an alkaline aqueous wash to elute the vanadate values.

24. The process of claim 21 wherein the anthraquinone disulfonate values are eluted from the carbon by using an alkaline aueous wash, the vanadate values are eluted from the anion exchange resin by using an alkaline aqueous wash, and the so-recovered anthraquinone disulfonate values and vanadate values are recycled back to the Stretford Process.

25. The process of claim 21 wherein the exchange resin is washed with a caustic solution to extract the vanadate values therefrom, then the same caustic solution is used to wash ADA values from the carbon and the caustic solution, containing the vanadate values and ADA values, is recycled to the Stretford Process solution.

* * * * *

UNITED STATES PATENT AND TRADEMARK OFFICE
CERTIFICATE OF CORRECTION

PATENT NO. : 4,385,044

DATED : May 24, 1983

INVENTOR(S) : Richard A. Wolcott

It is certified that error appears in the above—identified patent and that said Letters Patent is hereby corrected as shown below:

Col. 5, Claim 2, line 55; correct "regeneraed" to --regenerated--.

Col. 6, Claim 13, line 43; correct "35°" to --35°C--.

Col. 8, Claim 24, line 19; correct "aueous" to --aqueous--.

Signed and Sealed this

Twentieth Day of September 1983

[SEAL]

Attest:

GERALD J. MOSSINGHOFF

Attesting Officer

Commissioner of Patents and Trademarks